United States Patent
Naritomi et al.

(10) Patent No.: US 8,273,464 B2
(45) Date of Patent: Sep. 25, 2012

(54) METAL AND RESIN COMPOSITE AND METHOD FOR MANUFACTURING SAME

(75) Inventors: Masanori Naritomi, Chuo-ku (JP); Naoki Andoh, Chuo-ku (JP)

(73) Assignee: Taisei Plas Co., Ltd., Tokyo (JP)

( * ) Notice: Subject to any disclaimer, the term of this patent is extended or adjusted under 35 U.S.C. 154(b) by 593 days.

(21) Appl. No.: 12/445,638

(22) PCT Filed: Oct. 16, 2007

(86) PCT No.: PCT/JP2007/070205
§ 371 (c)(1),
(2), (4) Date: Apr. 15, 2009

(87) PCT Pub. No.: WO2008/047811
PCT Pub. Date: Apr. 24, 2008

(65) Prior Publication Data
US 2010/0316878 A1    Dec. 16, 2010

(30) Foreign Application Priority Data

Oct. 16, 2006 (JP) .................. 2006-281961

(51) Int. Cl.
*B29C 45/14* (2006.01)
*B32B 15/08* (2006.01)
*B32B 15/09* (2006.01)

(52) U.S. Cl. .......................................... 428/461; 216/52
(58) Field of Classification Search ................ 428/461; 216/52
See application file for complete search history.

(56) References Cited

FOREIGN PATENT DOCUMENTS

| JP | 2000-271957 | A |   | 10/2000 |
|----|-------------|---|---|---------|
| JP | 2000271957  | A | * | 10/2000 |
| JP | 2001-225352 | A |   | 8/2001  |
| JP | 2006-1216   | A |   | 1/2006  |
| JP | 2006-27018  | A |   | 2/2006  |

* cited by examiner

*Primary Examiner* — Kelechi Egwim
(74) *Attorney, Agent, or Firm* — Westerman, Hattori, Daniels and Adrian, LLP

(57) ABSTRACT

An object of the present invention is to obtain a composite in which a copper or copper alloy is securely integrated with and joined to PBT or PPS. A copper product that has been suitably roughened by chemical etching and also blackened can be used favorably. A surface-treated copper piece 1 is inserted into a cavity formed by a movable molding plate 2 and a stationary molding plate 3 of an injection molding mold 10, and a specific resin is injected to obtain an integrated product. PBT or PPS can be used as the resin component of a resin composition 4 that is used here. High injection joining strength is obtained if the resin composition contains, as an auxiliary component, PET and/or a polyolefin resin in the case of PBT, and a polyolefin resin in the case of PPS.

4 Claims, 6 Drawing Sheets

APPARATUS: JSM 7401F
ACCELERATION VOLTAGE (kV): 2.0
MAGNIFICATION: ×10,000
IMAGE: LEI
(LOWER DETECTOR)
MEASUREMENT DATE: 2/20/07

APPARATUS: JSM 7401F
ACCELERATION VOLTAGE (kV): 2.0
MAGNIFICATION: ×100,000
IMAGE: SEI
(SECONDARY ELECTRON IMAGE)
MEASUREMENT DATE: 2/20/07

APPARATUS: JSM 7401F
ACCELERATION VOLTAGE (kV): 2.0
MAGNIFICATION: ×10,000
IMAGE: LEI
(LOWER DETECTOR)
MEASUREMENT DATE: 9/22/06

APPARATUS: JSM 7401F
ACCELERATION VOLTAGE (kV): 2.0
MAGNIFICATION: ×100,000
IMAGE: SEI
(SECONDARY ELECTRON IMAGE)
MEASUREMENT DATE: 9/22/06

APPARATUS: JSM 7401F
ACCELERATION VOLTAGE (kV): 2.0
MAGNIFICATION: ×10,000
IMAGE: LEI
(LOWER DETECTOR)
MEASUREMENT DATE: 2/20/07

APPARATUS: JSM 7401F
ACCELERATION VOLTAGE (kV): 2.0
MAGNIFICATION: ×100,000
IMAGE: SEI
(SECONDARY ELECTRON IMAGE)
MEASUREMENT DATE: 2/20/07

APPARATUS: JSM 7401F
ACCELERATION VOLTAGE (kV): 2.0
MAGNIFICATION: ×10,000
IMAGE: LEI
(LOWER DETECTOR)
MEASUREMENT DATE: 2/20/07

APPARATUS: JSM 7401F
ACCELERATION VOLTAGE (kV): 2.0
MAGNIFICATION: ×100,000
IMAGE: SEI
(SECONDARY ELECTRON IMAGE)
MEASUREMENT DATE: 2/20/07

APPARATUS: JSM 7401F
ACCELERATION VOLTAGE (kV): 2.0
MAGNIFICATION: ×10,000
IMAGE: LEI
(LOWER DETECTOR)
MEASUREMENT DATE: 1/30/07

APPARATUS: JSM 7401F
ACCELERATION VOLTAGE (kV): 2.0
MAGNIFICATION: ×100,000
IMAGE: SEI
(SECONDARY ELECTRON IMAGE)
MEASUREMENT DATE: 1/30/07

METAL AND RESIN COMPOSITE AND METHOD FOR MANUFACTURING SAME

TECHNICAL FIELD

The present invention relates to a composite of a metal (a metal part or an alloy part, particularly based on copper) and a resin (a resin composition), used in the housing of electronic equipments, the housing of consumer electrical equipments, mechanical parts and so forth and relates to a method for manufacturing the composite. More particularly, the present invention relates to a composite obtained by integrating a copper part or a copper alloy part manufactured by mechanical working with a thermoplastic resin and relates to a method for manufacturing the composite, specifically relates to a metal and resin composite that is favorable for use in various kinds of mobile electronic equipments, consumer electrical equipments, medical instruments, automotive structural parts, automotive mounted equipments, other electrical parts, heat-radiating parts and so forth and relates to a method for manufacturing the composite.

BACKGROUND OF THE INVENTION

Technology for integrating a metal and a synthetic resin is needed in a wide range of industrial fields such as automobiles, consumer electrical equipments, industrial machineries and other such part manufacturing industries and various adhesives have been developed for this purpose. Some of these adhesives are very excellent. For example, adhesives that exhibit their function at normal temperature or under heating are used to join and integrate metals and synthetic resins, so this method is at present the standard joining technique.

On the other hand, research has been conducted into a more rational joining method that does not entail the use of any adhesive. An example of this is a method in which a high-strength engineering plastic resin is integrated with a light metal such as magnesium, aluminum, an alloy thereof or an iron ally such as stainless steel without any adhesive. For example, the inventors have proposed a method in which molten resin is injected into a metallic mold into which a metal part is preliminarily inserted thereby forming a resin part and at the same time a molded part is joined to the metal part (such method being hereinafter abbreviated as "injection joining").

The proposed method concerns a manufacturing technique with which a polybutylene terephthalate resin (hereinafter referred to as "PBT") or polyphenylene sulfide resin (hereinafter referred to as "PPS") is injected and joined to an aluminum alloy (see Japanese Patent Application Laid-Open 2004-216425: Patent Document 1, for example). There has also been disclosed a joining technique in which relatively large holes of 25 nm or greater are formed in an anodized film of aluminum material and synthetic resin protrudes into the holes, thus bonding being made (see WO2004-055248: Patent Document 2, for example).

The principle of injection joining proposed in Patent Document 1 is as follows. Aluminum alloy is immersed in dilute aqueous solution of water-soluble amine compound and the aluminum alloy is finely etched by the aqueous solution of weak basicity. It was found that adsorption of the amine compound molecules to the surface of the aluminum alloy occurs at the same time in this immersion. After undergoing this treatment, the aluminum alloy is inserted into the metallic mold for injection and a molten thermoplastic resin is injected under high pressure.

Heat is then generated through contact between the thermoplastic resin and the amine compound molecules adsorbed to the surface of the aluminum alloy. Substantially at the same time as this heat generation, the thermoplastic resin is quenched by contact with the aluminum alloy, which is kept at low temperature of the mold, and therefore the resin, which was apt to solidify as well as crystallize, is caused to make its solidification retarded and protrude into the extremely fine concave portion on the surface of the aluminum alloy. Consequently, the aluminum alloy and the thermoplastic resin are securely joined (affixed) without the resin coming loose from the surface of the aluminum alloy. That is, when exothermic reaction occurs, secure injection joining can be obtained. It has been actually confirmed that PBT or PPS, which undergoes an exothermic reaction with an amine compound, can be joined by injection joining to this aluminum alloy. With another well known technique, chemical etching is performed preliminarily, then a metal part is inserted into the metallic mold of the injection molding apparatus and injection molding is performed using a thermoplastic resin material (see Japanese Patent Application Laid-open 2001-225352: Patent Document 3, for example).

However, while joining based on the principle mentioned above does have an extremely good effect with aluminum alloys and the like, the same effect is not necessarily obtained in injection joining to metals other than aluminum alloys. There has therefore been a need for the development of a new joining technique. The inventors discovered a novel technique while developing and improving the injection joining of hard resins to aluminum alloys. Specifically, conditions were discovered under which injection joining is possible without chemical adsorption of an amine compound to the surface of a metal part or, in other words, without help of an extra exothermic reaction or any special chemical reaction.

At least two conditions are necessary for this. The first condition is that a hard resin of high crystallinity be used, that is, that PPS, PBT or an aromatic polyamide be used, while this condition alone does not provide the desired result and more practical joining will be obtained by making these a composition that is further improved and suited to injection joining. The other condition is that the metal part that is inserted into the mold have a strong and hard surface layer.

For example, when a shaped magnesium alloy is used as the base material, this alloy is subjected to a chemical conversion treatment or an electrolytic oxidation treatment to produce a surface of metal oxide, metal carbonate or metal phosphate which creates a surface covered with a hard ceramic substance, since corrosion resistance is low with a magnesium alloy that is only covered with a natural oxidation layer. The above-mentioned conditions can be met with magnesium alloy parts having these surface layers.

Theoretically, the following applies if we consider a case in which a shaped and surface treated magnesium alloy is inserted into a metallic mold for injection molding. Since the metallic mold and the inserted shaped magnesium alloy are kept at a temperature that is at least 100° C. below the melting point of the resin to be injected, it is very likely that the injected resin will be quenched as soon as it flows into the channel inside the metallic mold and the temperature will drop below its melting point upon coming into close proximity with the magnesium metal part.

When crystalline resin is suddenly cooled from a molten state to a temperature below its melting point, it does not crystallize and solidify instantly, regardless of the type of crystalline resin and there is a certain time, albeit short, during which the resin remains in a molten state below its melting point, that is, in a super-cooled state. If the concave portions of the shaped magnesium alloy have a relatively large diameter of about 100 nm, there will be enough time for the resin to enter the concave portions within the limited time in which microcrystallization occurs from super-cooling. Even if the numerical density of the macromolecular crystal groups thus produced are still low, the resin will still be able to enter the concave portions as long as they are large enough. This is because the size of microcrystals, more specifically microcrystals having a shape formed when a change from irregularly moving molecular chains into molecular chains with some kind of ordered state occurred, is considered to be from just a few nanometers to 10 nm, assuming a molecular model.

Therefore, it is not allowed necessarily to say that microcrystals can easily infiltrate ultrafine concave portions having a diameter of 20 to 30 nm, but it is possible to determine that they can infiltrate if the concave portions are about 100 nm in size. However, since countless microcrystals are produced simultaneously, there is a sharp rise in the viscosity of the resin flow at distal ends of the injected resin and at positions where it touches the face of the metallic mold. Therefore, if the concave portions are about 100 nm in size, the resin may not be able to infiltrate all the way inside of the concave portions, but will crystallize and solidify after infiltrating to a substantial extent into the interior, so a considerable joining strength is obtained. Here, if the surface of the shaped magnesium alloy is of a hard and strong surface layer comprising an amorphous layer or a ceramic microcrystal group such as a metal oxide, there will be better hooking between the shaped magnesium alloy and the resin, that is, the joining strength will be higher.

In addition to the two conditions mentioned above and related to surface treatment of the shaped material, the present invention adds an improvement of the resin composite to be injected. This relationship will be described below. When injection molding has been performed, the resin composite is quenched from a molten state to a temperature below the melting point and, if the resin composite has a lowered crystallization speed, the joining strength will be higher. This is a condition for a resin composition suitable for injection joining.

On the basis of this, the inventors discovered and proposed that a hard crystalline resin can be joined to a shaped magnesium alloy by injection joining so as to obtain a high joining strength by chemically etching a shaped magnesium alloy and then subjecting it to a chemical conversion treatment or other such surface treatment to make the surface layer a hard ceramic (Japanese Patent Application 2006-272832). Specifically, if there is suitable texturing, at least for all metals and metal alloys, there is a possibility of injection joining by using PBT or PPS that has been improved for injection joining.

What has been disclosed as prior art will now be described. Patent Document 3 discloses a method in which chemically etched copper wires are inserted into an metallic mold for injection, PPS or the like is injected and a battery cover with lead wires attached is produced in a configuration in which a plurality of copper wires stick out from the middle portion of a PPS disc. It is stated that a feature of the art is that because of surface texturing (roughness) of the copper wires by chemical etching, no gas leaks through the lead wire portions even if the internal pressure of the battery should rise.

The technique disclosed in Patent Document 3 is not an injection joining technique but is instead an injection molding technique that utilizes the relationship between the coefficients of linear expansion of metal and molding shrinkage of resin. In the case where resin is injected into the peripheral portion of a sticking out, rod-shaped metal substance in the mold and thereafter the molded article is taken out of the mold and allowed to be cooled, the metal rod will be in a state tightly fastened by the molded resin part. The reason is that the coefficient of linear expansion of metal is at most 1.7 to $2.5 \times 10^{5 \circ}$ $C.^{-1}$ for aluminum alloy, magnesium alloy, copper or copper alloy and even when the product is taken out of the mold and cooled to room temperature, the shrinkage in an order of the coefficient of linear expansion×100° C. is only about 0.2 to 0.3%.

On the other hand, molding shrinkage for resin is about 1% for PPS and 0.5% for PPS containing glass fiber and even for resin with an increased filler content the resin part always shrinks more than the metal part after injection molding. Therefore, if a molded article with a metal part in the middle and a sticking out resin part is produced by injection molding with an insert, an integrated product in which the metal part is unlikely to come loose can be manufactured because of the tightening effect produced by the molding shrinkage of the resin part. Also, the art disclosed in Patent Document 3 does not involve affixing of a resin to a metal but instead is a joining technique for reducing the leakage of internal gas through the joint faces of the two components. That is, it is not an art premised on the affixing of the two.

This method for manufacturing an integrated metal and resin of the fastened type is known conventionally and a similar molded article is the handle of a kerosene heater. A thick iron wire with a diameter of about 2 mm is inserted into a metallic mold for injection molding and heat-resistant resin or the like is injected. Serrations (knurling) is formed on the wire to keep the resin in place. The art disclosed in Patent Document 3 has a feature such that the texturing is made more efficient by changing from physical working to chemical working, which also makes the texturing somewhat finer, and that a resin which is hard and crystalline is used for raising gripping effect.

There is no need whatsoever for the resin to be enveloped with the present invention. When two flat shaped plates are joined together, it needs a tremendous force to break them apart. A major feature of the technique of the present invention for increasing joining strength is the use of a crystalline resin composition with high hardness that crystallizes and solidifies over a long super-cooling period during quenching.

For the joined state of a metal and a thermoplastic resin to be maintained stably over an extended period, it is actually necessary for the coefficients of linear expansion of the two materials to be of close values. The coefficient of linear expansion of thermoplastic resin composition can be lowered considerably by adding a large quantity of filler, namely, glass fiber, carbon fiber or another such reinforcing fiber but the limit for this is $(2 \text{ to } 3) \times 10^{-5 \circ}$ $C.^{-1}$. Types of metal that are close to this value at an approximate room temperature include aluminum, magnesium, copper and silver.

SUMMARY OF THE INVENTION

The present invention relates to a technique which allows a hard resin to be joined to copper or a copper alloy by injection joining. This technique is favorable, for example, for rationalizing the manufacture of heat-radiating parts that are needed for notebook computers and the like. It is also extremely useful for sealing in preventing gas leakage at places where the copper lead wires protrude out of a plastic container of a sealed electrical instrument.

The inventors have developed established technique such as the surface treatment of shaped copper, with the aim of making injection joining possible for copper and copper alloys as discussed above. Although the methods for etching and surface treating of copper products are themselves not in line with the object of the present invention at all, many of these methods have been developed and put to practical use. Specifically, with a method for bonding (laminating) a copper foil and a resin film, a better joint is obtained when the copper foil surface has been suitably textured (roughened) than when it is smooth. Surface rougheners for copper foil have been developed and are commercially available. Also commercially available are reagents for chemically etching copper films and the like on plastics that have been electroplated with copper, rather than on wrought copper or copper alloy products. Copper etching and the handling of etched copper parts truly constitute one of the most important techniques for manufacturers of wiring boards for electrical and electronic instruments today.

Meanwhile, a technique in which the surface of a shaped copper or copper alloy is covered with a ceramic (metal oxide or metal phosphate) substance and thereby hardened is widely used in the electrical and electronic industries, although the object of working differs. This technique is called "blackening" in the parlance of those skilled in the art in the field of printed wiring board. It refers literally to a chemical process for blackening a metal part in its broad sense, while it refers to oxidizing a copper part to produce a surface layer of black cupric oxide in a narrower sense. The purpose of blackening is to blacken the metal surface, to enhance thermal radiation and to make the surface chemically passive and stabilized as much as possible.

It is an object of the present invention to make the surface of a copper part a hard ceramic such as a metal oxide or metal phosphate, for which any existing method for turning the surface layer into a metal oxide can be used, regardless of the color that is imparted. However, to actually obtain strong injection joining, the joint strength must be high enough between the copper or copper alloy serving as the base and the resulting ceramic surface layer. In this sense, the production of a copper oxide layer by oxidizing the copper base itself is also effective.

The most important conditions for the injection joining of a metal and a resin will be reviewed from the hypothesis in the present invention. This hypothesis was proposed for application to the above-mentioned magnesium alloy, while it has been further expanded. Specifically, though the following hypothesis is applied to copper or copper alloy in addition to magnesium alloy, in fact it is predicted that it is applicable to all metal alloys. The hypothesis related to injection joining newly proposed by the inventors will be discussed below.

First, the following conditions are essential for the surface of the metal used in the composite.

(1) The surface must have large texturing (roughness) obtained by chemical etching with the period of the bumps and pits being 0.5 to 10 μm.

(2) There must be ultrafine texturing that is sufficiently hard and serves a non-slip role on at least the inner walls of the concave parts formed by the rough surface or, to put it in another way, "the inner wall of a large concave part must be a coarse face when viewed microscopically".

(3) Any crystalline resin of high hardness can be used as the resin, while an improved resin composition is preferably used for which the crystallization during quenching is slowed.

This hypothesis was proved to be true by the present invention for copper and copper alloys as well, wherein the "coarse face" mentioned above in (2) can be confirmed by observation with an electron microscope at a magnification of about 100,000 times. This coarse face is a face with ultrafine concave and convex portions in which the periodic spacing between concave and convex portions is at least 10 nm, the height or depth is at least 10 nm and the face with concave and convex portions afford a high injection joining strength.

The present invention was conceived in light of the technological background discussed above, proves that the above-mentioned hypothesis related to copper and copper alloys is true and achieves the following object.

It is an object of the present invention to provide a metal and resin composite that affords high joint strength when a resin is joined to a shaped copper or copper alloy by injection joining and to provide a method for manufacturing the composite.

It is another object of the present invention to provide a metal and resin composite with enhanced joinability by injection joining between a shaped copper or copper alloy that has undergone chemical conversion treatment and a high-hardness crystalline resin composition and a method for manufacturing the composite.

The present invention employs the following means to achieve the stated object. Specifically, the gist of the metal and resin composite of the present invention is characterized in that the composite comprises a copper or copper alloy substrate, which is worked into a specific shape by mechanical working and is then chemically etched to dissolve a surface thereof and in which the surface is covered with a thin layer of a copper oxide formed by an oxidant under strongly basic conditions and a first resin composition, whose main component is a polyphenylene sulfide resin and which is joined directly to the above-mentioned surface by injection molding, or a second resin composition, whose main component is a polybutylene terephthalate resin.

The method for manufacturing a metal and resin composite pertaining a first aspect of the present invention comprises a shaping step of shaping a copper or copper alloy substrate by mechanical working, a step of chemical etching and chemical conversion treatment of performing chemical etching to dissolve the surface of the shaped substrate and then performing a treatment involving immersion in an aqueous solution containing sodium chlorite for producing a surface having ultrafine concave and convex faces with spacing of at least 10 nm and height or depth of at least 10 nm and a surface roughness with height difference of at least 0.5 μm at period of 1 to 100 μl constituted by the faces, an insertion step of inserting the substrate that has undergone the step of chemical etching and chemical conversion treatment into a metallic mold for injection molding and an integration step of injecting a first resin composition, in which a polyphenylene sulfide resin is a main component and a polyolefin resin is an auxiliary component, or a second resin composition, in which a polybutylene terephthalate resin is a main component and a polyethylene terephthalate resin and/or polyolefin resin is an auxiliary component, into the metallic mold with the substrate inserted and integrating the substrate with the first resin composition or the second resin composition.

The method for manufacturing a metal and resin composite pertaining a second aspect of the present invention comprises a shaping step of shaping a copper or copper alloy substrate by mechanical working, a step of chemical etching and chemical conversion treatment of performing chemical etching to dissolve the surface of the shaped substrate and then performing a treatment involving immersion in an aqueous solution containing sodium chlorite for producing a surface having ultrafine concave and convex faces with spacing of at least 10 nm and height or depth of at least 10 nm and large concave-convex period of the concave and convex faces of 0.5 to 10 μm as peak-valley average spacing (RSm) and 0.2 to 5 μm as maximum roughness height (Rz), an insertion step of inserting the substrate that has undergone the step of chemical etching and chemical conversion treatment into a metallic mold for injection molding and an integration step of injecting a first resin composition, in which a polyphenylene sulfide resin is a main component and a polyolefin resin is an auxiliary component, or a second resin composition, in which a polybutylene terephthalate resin is a main component and a polyethylene terephthalate resin and/or polyolefin resin is an auxiliary component, into the metallic mold with the substrate inserted and integrating the substrate with the first resin composition or the second resin composition.

The size of the ultrafine concave and convex faces is determined by observation with electron microscope at magnifications of 10,000 times, 100,000 times, etc. To observe the period of the concave and convex faces in micron units, an optical microscope or a scanning probe microscope is generally best for use and the concave and convex period of the peak-valley average spacing (RSm) and maximum roughness height (Rz) of the present invention is found using these. The definitions of the peak-valley average spacing (RSm) and maximum roughness height (Rz) are as given in the Japan Industrial Standards (JIS) (B0601:2001) and the International Organization for Standardization (ISO).

DETAILED DESCRIPTION OF EMBODIMENTS

Figure 1:
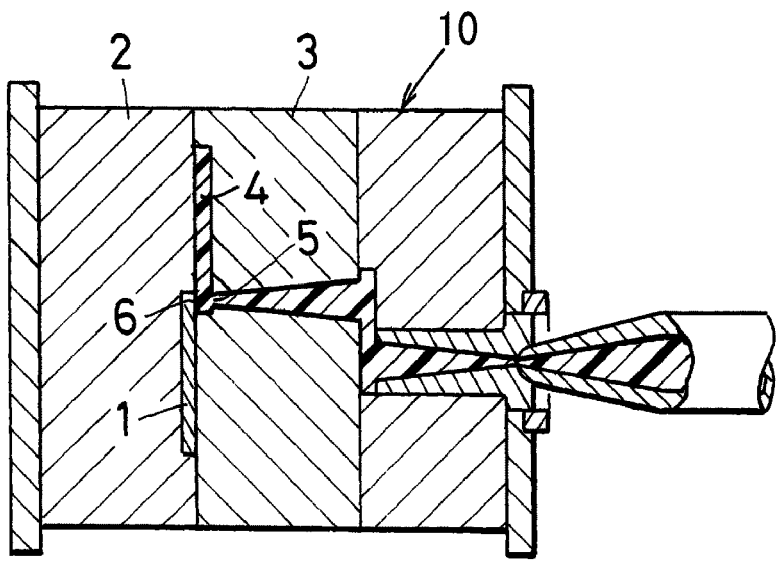
FIG. 1 is a view of a metallic mold schematically illustrating the process of manufacturing a composite of a metal and a resin (a copper piece and a resin composition).

The elementary matters of the present invention will now be described in further detail.
[Substrate Composed of Copper or Copper Alloy]

The term "substrate" as used in the present invention refers to a wrought copper or copper alloy product, a shaped product obtained by mechanically working a wrought copper or copper alloy product into a part, a plated product obtained by plating another metal with copper and so forth. The term "wrought copper or copper alloy product" here is a collective name for products worked into plates, strips, tubes, wires or other such shapes by melting, casting, rolling, drawing, forging, or other hot or cold plastic working methods. In general, these "wrought copper or copper alloy products" refer to products that meet the standards set forth in the Japan Industrial Standards (JIS), International Organization for Standardization (ISO) and so forth as well as in-house standards by the manufacturers that make individual copper products. Copper plated products include those produced by electroplating and non-electroplating of copper, both of which can be used. In view of material classification, it is possible to use pure copper, brass, phosphor bronze and nickel silver (also called cupronickel) as well as many different kinds of special copper alloys used in the electrical and electronic industries, such as those developed by Kobe Steel (Hyogo, Japan) and so on.
[Surface Treatment/Outline]

The copper or copper alloy substrate of the present invention must be chemically etched, while its surface is preferably covered with a ceramic. Cupric oxide can be used favorably as this ceramic. Usually, the copper or copper alloy is subjected to the following treatment steps:
  a) degreasing,
  b) chemical etching and
  c) surface hardening.
In the present invention, these steps are collectively referred to as surface treatment.

The "a) degreasing" in the outline above is a treatment process performed in order to remove substances adherent to the copper parts such as coolant used in mechanical working, the fingerprints and so forth that adhere to the copper parts having undergone mechanical working and so forth by immersing the parts in an aqueous solution containing a surfactant to wash away the adherent substances. There are commercially available degreasers that in addition to a surfactant contain hydrogen peroxide and a mineral acid such as hydrochloric acid or sulfuric acid, which dissolve the natural oxidation layer on the surface at the same time as degreasing and expose the bare copper surface. Here, the surface treatment performed in the present invention entails performing a "chemical etching step" separately after the degreasing step. Then, if one of these degreasers is used, a surface treatment step that dissolves the copper surface will end up being performed twice, which poses problems in terms of reproducing the ideal surface state. Accordingly, degreasing with these degreasers is undesirable. Also, this degreasing step can be omitted with a product that has undergone step of non-electroplating of copper or the like in which degreasing is unnecessary, because the result will be a clean copper surface.

The "b) chemical etching" in the outline above usually involves the use of a method in which copper is oxidized and dissolved as copper ions into an aqueous solution and this method can also be used in the present invention. Normally, dissolution by chemical etching proceeds from the grain boundary of the metal microcrystals, so fine concave and convex faces can be produced naturally. The crystal grain size varies in the step of obtaining the copper or alloy thereof, so commercially available copper etchants are divided into those used for wrought copper or copper alloys and those used for non-electroplating of copper and also divided into those used for immersion and those used for spraying according to the manner of usage, for example. However, the basic matter about the chemical etchant is that hydrogen peroxide is used as an oxidant and sulfuric acid is also used as a stabilizer for the copper ions that are produced.

Here, such etchant is an aqueous solution containing hydrogen peroxide and sulfuric acid, although commercially available products may have some third component added so as to achieve more stable roughening. Any of these can be used with the present invention, while the immersion conditions must be selected according to the alloy. Immersion conditions are chosen as dictated by the type of alloy, then the rough surface shape is formed which has concave and convex portions with a period of 1 to 10 μm, the height difference between the concave and convex portions being about half of the concave and convex period and the maximum roughness height being about 0.5 to 5 μm or, in other words, the face roughness being a roughness curve with a period in micron units preferably, using an aqueous solution whose main components are basically sulfuric acid and hydrogen peroxide. Though this face roughness is required for the final product after treatment, it is extremely crucial to choose suitable treatment conditions, since the roughness obtained in the etching step is reflected almost directly on the roughness of the product after final treatment.

Etching is particularly difficult for pure copper. Specifically, for pure copper or phosphor bronze, the concave and convex period is at least 10 μm and is not readily shortened, perhaps because of their large crystal grain size, even under harsh etching conditions (with the immersion time increased). It is undesirable for the concave and convex period to be 10 μm or higher because the injection joining strength drops off sharply. Therefore, treatment by some other approach is necessary, as will be shown in the working examples. Putting it in the other way, the idea that these copper alloys can be roughened merely by using an aqueous solution of sulfuric acid and hydrogen peroxide does not apply in surface treatment for injection joining.

Meanwhile, over-etching can conversely be a problem for copper alloys that are not pure copper. If the etching conditions are too harsh, the concave and convex height difference will be too great and the etching will proceed not only in the vertical direction but also in the lateral direction or at an angle in the interior of the concave portions that have been produced, resulting in an undesirably complicated three-dimensional shape, even though the concave and convex period of the rough face will not be beyond the expected range. The reason why it is undesirable for the etching to go too deeply is that the concave portions will be so deep that the injected resin cannot infiltrate all the way, so numerous voids occupied by neither the metal nor the resin will be produced in the joined part, thus the product will be weaker with respect to breakage as a result. Shortly speaking, the etching conditions for forming a regular rough face on the micron order indicated by the inventors are fairly restricted and must be obtained by considerable trial and error. More specific examples will be given in the working examples.

The importance of using chemical etching will now be discussed. Regardless of which method is employed, basically the surface shape should be as above, where it is to be considered why chemical etching is employed. When a current sophisticated ultrafine working method is employed, in which a photochemical resist is applied and visible light rays or UV rays are used, it is believed that the intended faces with micron-order ultrafine concave and convex portions might be attained. However, not only does chemical etching involve a simple operation, but it is extremely favorable for injection joining. Specifically, when chemical etching is performed under suitable conditions, not only will the desired concave and convex period and the desired depth of the concave portions be obtained but the fine shape of the resulting concave portions will not be a simple shape and many of the concave portions will have an 'undercut structure'. An 'undercut structure' means that there are faces that are invisible when the concave portions are viewed from the outside and there would be an overhang if viewed microscopically from the bottom of the concave portions. It will be readily understood that an 'undercut structure' is necessary to injection joining Next, the "c) surface hardening step" will be discussed. In this step it is probably easiest and most efficient to adopt a method in which the metal phase etched and stripped away in the previous step is oxidized to make the surface ceramic, that is, to change it into a metal oxide. Since the metal is copper in the present invention and the generated copper ions are not desired to be eluted into the water, though a suitable oxidant is used to oxidize the copper, it seems to be better for the oxidation to be performed under strongly basic conditions. Although it is not necessarily inevitable to use, the easiest method is to adjust the liquid temperature so as to be between 60 and 80° C., adjust the caustic soda to a concentration of 5 to 15% and use an aqueous solution containing sodium chlorite with a concentration of a few percent as the oxidant. This method is extremely favorable.

Conventionally, in a pure copper blackening treatment performed to increase the dissipation of radiant heat from the copper covered parts facing outwards and to cool heat-generating electrical circuits and so forth, the usual practice was to use a mixed aqueous solution of caustic soda and sodium chlorite and allow the oxidation to proceed at a high temperature between 85 and 100° C. The same reaction can be used for the surface hardening treatment of the present invention, but in the present invention the thickness of the copper oxide layer is not of the utmost importance. As long as the hardened layer is strong, the object will be attained even if the layer is thin, so the reaction conditions can be more moderate and wider. More specifically, the temperature of aqueous solution of caustic soda and sodium chlorite with the above-mentioned concentration is preferably adjusted so as to be between 50 and 80° C., with the immersion lasting several minutes. There are also commercially available copper blackening agents, which can similarly be used.

When the above-mentioned surface hardening aqueous solution is used for the chemical conversion treatment of copper or a copper alloy after the above-mentioned etching, the surface is covered with a thin layer of cupric oxide. According to the experience of the inventors, if immersion takes too long time in this chemical conversion treatment, that is, if the resulting cupric oxide layer is too thick, there is actually a decrease in injection joining strength. It is a belief of the inventors that this is because the thicker is the layer of ceramic on the surface, the more the decrease in joint strength between the alloy metal phase and the ceramic layer. In any case, the surface does turn black if this treatment is performed for a long time, while the immersion time is kept in a short time just long enough to harden the surface layer as desired in the present invention.

This immersion in the chemical conversion treatment liquid for a short time produces an ultrafine structure on the surface. In short, immersion in the chemical conversion treatment liquid achieves a result equivalent to two treatments, "fine etching" and "surface hardening." Here, explanation is made about the surface analysis after the surface hardening has been performed. Results of analyzing the surface elements by XPS showed that oxygen and copper were detected and minute amounts of carbon and silicon were also confirmed. This makes it apparent that the surface layer is either copper oxide or copper hydroxide, thus the substance was concluded to be cupric oxide since the color is black.

Electron micrographs of the copper or copper alloy obtained by immersion for a short time in a high-temperature aqueous solution containing caustic soda and sodium chlorite are given below. FIG. 3 is a micrograph of a substance close to pure copper, that is, oxygen-free copper (JIS: C1020), FIG.

Figure 4A:
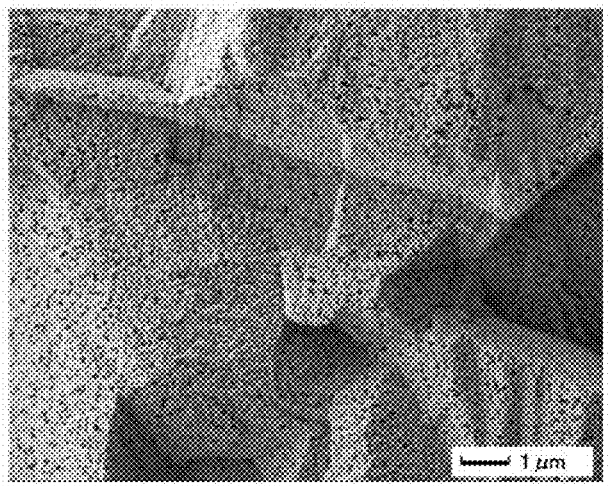
FIGS. 4(a) and (b) are micrographs of the surface of a C1100 tough pitch copper piece obtained by oxidation treatment with sodium chlorite and using a hydrogen peroxide aqueous solution as an etchant.
Figure 4B:
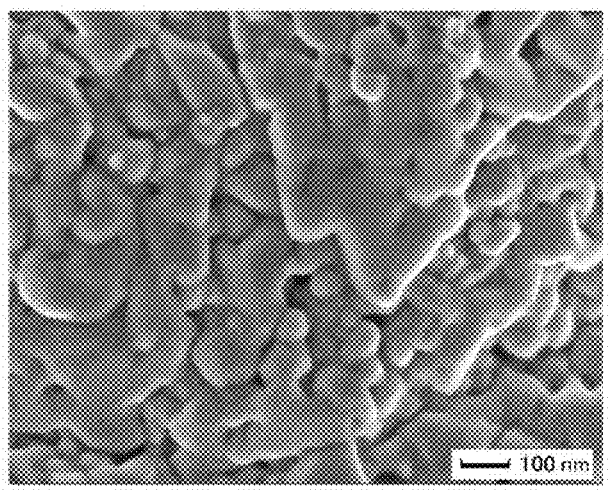
Figure 5A:
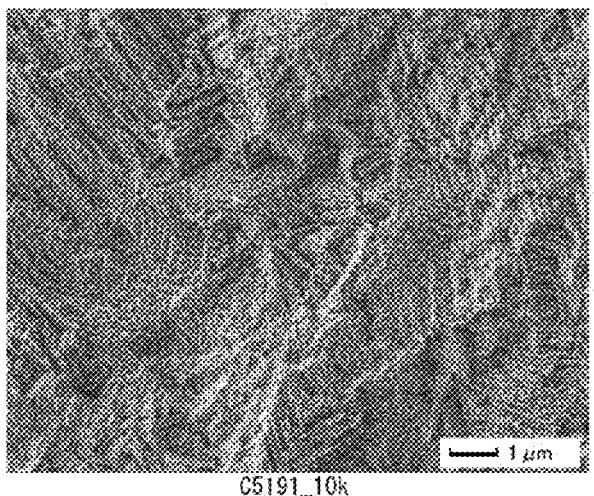
FIGS. 5(a) and (b) are micrographs of the surface of a C5191 phosphor bronze piece obtained by oxidation treatment with sodium chlorite and using a hydrogen peroxide aqueous solution as an etchant.
Figure 5B:
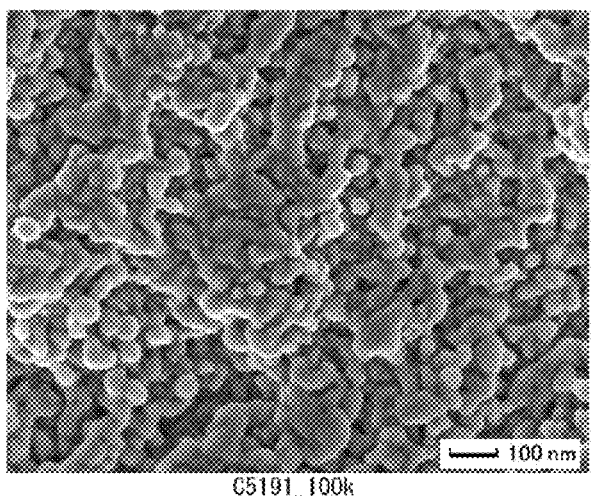
Figure 6A:
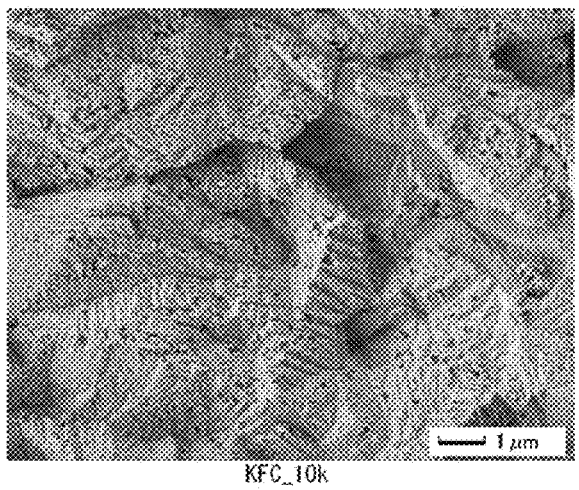
FIGS. 6(a) and (b) are micrographs of the surface of a "KFC (made by Kobe Steel)" iron-containing copper alloy piece obtained by oxidation treatment with sodium chlorite and using a hydrogen peroxide aqueous solution as an etchant.
Figure 6B:
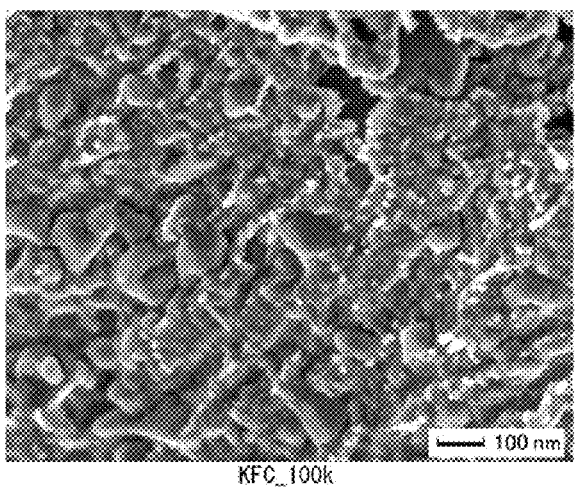
Figure 7A:
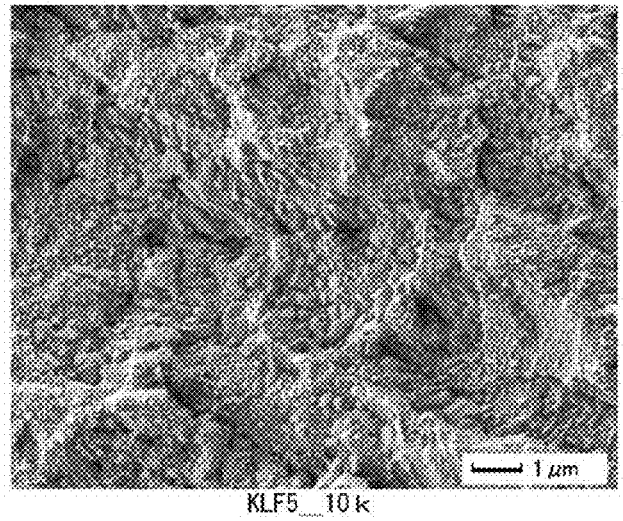
FIGS. 7(a) and (b) are micrographs of the surface of a "KLF5 (made by Kobe Steel)" connector-use copper alloy piece obtained by oxidation treatment with sodium chlorite and using a hydrogen peroxide aqueous solution as an etchant.
Figure 7B:
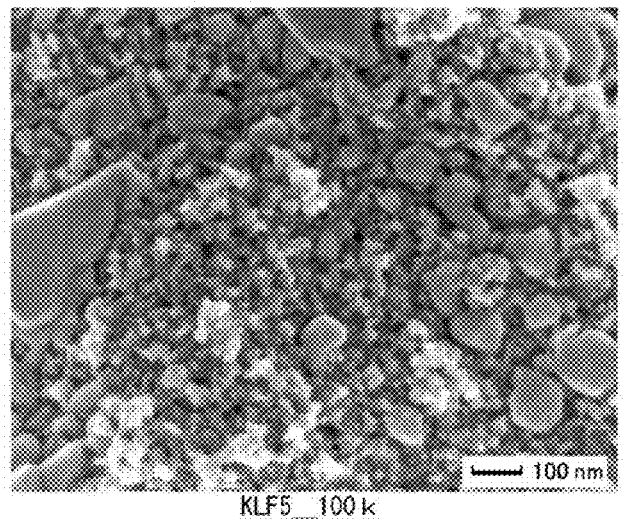

4 is a micrograph of tough pitch copper (JIS: C1100) and FIG. 5 is a micrograph of phosphor bronze (JIS: C5191), which is not pure copper but yields a similar micrograph after the above-mentioned surface treatment. Meanwhile, for copper alloys that are markedly different from pure copper with increased mechanical strength, the micrographs are very different from the above. FIG. 6 is a micrograph of KFC (trademark of Kobe Steel; Japan for a copper alloy containing iron and phosphorus) and FIG. 7 is a micrograph of KLF5 (trademark of Kobe Steel for a copper alloy used for connectors). FIGS. 3a to 7a are electron micrographs taken at magnification of 10,000 times, while FIGS. 3b to 7b are at 100,000 times.

An electron micrograph at 100,000 times gives good resolution of just a few nanometers, and the ultrafine concave and convex portions can be easily distinguished. One condition for ultrafine texturing hypothesized by one of the inventors, Ando, is that the concave and convex portions have a period of 10 to 300 nm on the surface. Under this hypothesis, the best concave and convex period is about 50 nm. The above-mentioned FIGS. 3 to 7 are all encompassed by this hypothetical condition, while it is hoped that the fundamental idea that the inventors wish to convey with this hypothesis will be understood from FIGS. 3 to 7 since the hypothesis itself indicates too many shape possibilities.

In FIG. 3, it can be seen that convex portions with diameters of 10 to 150 nm and of about the same heights, namely 10 to 200 nm, are present at intervals of 10 to 500 nm. Most area of the surface is covered by faces with a fine period and depth close to 10 nm, while in about one-half to one-quarter of such surface area convex portions or protrusions of large and small diameters are present in somewhat clumped state. A fine concave and convex period probably has no effect on the hooking of the injected resin but the aggregate faces of large and small convex portions may give rise to hooking effect. Nevertheless, this surface shape cannot be considered to provide the highest level of anchoring effect.

In FIG. 4, concave portions with diameters of 10 to 150 nm and depths of 10 to 500 nm are present at a spacing of 10 to 500 nm. Though the surface is shiny, concave portions of large and small diameters are located here and there and it is seen that a hooking effect is produced when the injected resin infiltrated into these portions and solidified. Still, it is found that the average spacing of the concave portions is large, that is, there are not enough of the concave portions and this is not the ideal shape for an anchoring effect. In FIG. 5, there is an ultrafine textured shape in which protrusions having diameters or major axis/minor axis average of 50 to 60 nm are present very close together, at spacing of nearly 10 nm, with convex portions even being fused together in some places. The period of the ultrafine concave and convex portions is close to 50 nm and therefore this shape can be considered ideal for providing an anchoring effect.

In FIG. 6, there is an ultrafine textured shape in which protrusions having diameters or major axis/minor axis average of 10 to 200 nm and spacing of at least 10 nm are present in mixed state over the entire surface. Here again, places where the convex portions are too small with diameters of 10 nm are thought to be too finely textured to have much effect, so this shape cannot be considered ideal but the anchoring effect seems to be better than that in FIG. 1 or 2. In FIG. 7, the ultrafine texturing is more or less ideal, with ultrafine concave and convex faces having spacing of at least 10 nm and a configuration in which amorphous polygons or granules with a diameter of 10 to 150 nm are disposed successively and partially stacked over one another after having melted together.

When a degreasing step, an etching step and a surface hardening step conforming to the above description are combined as above, it is found that copper alloys with the desired ultrafine structure are obtained without having to add an ultrafine etching step. Also, focused on just the ultrafine structure, alloys seemed to provide a more favorable ultrafine textured structure than pure copper did. The surface shape and surface properties aimed for by the present invention could probably be obtained by something, other than the surface treatment steps discussed above, but the above-mentioned process is extremely easy to implement, without using chemicals that are costly and difficult to handle industrially, and is considered a standard method for implementing the present invention.

[Resin Composition]

The resin composition used in the present invention refers to a first resin composition whose main component is a polyphenylene sulfide resin, which is a crystalline resin and which is directly joined to a copper or copper alloy substrate by injection molding or a second resin composition whose main component is a polybutylene terephthalate resin. The resin component of the first resin composition is a resin composition in which the polyphenylene sulfide resin is a main component and a polyolefin resin is an auxiliary component. The resin component of the second resin composition is a resin composition in which the polybutylene terephthalate resin is a main component and a polyethylene terephthalate resin and/or polyolefin resin is an auxiliary component.

The first resin composition should contain the above-mentioned polyphenylene sulfide resin in an amount of 70 to 97 wt % and the polyolefin resin in an amount of 3 to 30 wt %. The second resin composition should contain the polybutylene terephthalate resin in an amount of 70 to 97 wt %, and the polyethylene terephthalate resin and/or polyolefin resin in an amount of 3 to 30 wt %. The hard, crystalline resin composition serving as the resin composition here is preferably PPS or PBT that contains at least one type of filler selected from among glass fiber, carbon fiber, aramid fiber, other reinforcing fiber, calcium carbonate, magnesium carbonate, silica, talc, clay and glass powder in an amount of 20 to 60 wt % of the total composition. This is because addition of filler allows the coefficient of linear expansion of the molded resin to be between 2 and $3 \times 10^{-5}$ °$C.^{-1}$, which is close to the level of copper and copper alloys.

[Resin Composition/PPS]

The PPS resin composition will now be discussed. As to the makeup of the resin component in the PPS resin composition, if it is composed of a resin composition containing 70 to 97% PPS and 3 to 30% polyolefin resin, a composite with particularly good joining strength can be obtained. If the polyolefin resin content is less than 3%, addition of the polyolefin resin will have little effect of increasing the joining strength, but the same applies if the amount is over 30%. Also, with a PPS resin to which polyolefin resin has been added more than 30%, pyrolysis of the polyolefin resin within the injection tube of the injection molding apparatus will cause an abnormally large amount of gas to be generated, making injection molding itself difficult.

The PPS component may be any one belonging to the class called PPS, of which it is preferable to use one whose melt viscosity is 100 to 30,000 poise as measured with a Koka-type flow tester (according to The Society of Polymer Society, Japan) equipped with die having a diameter of 1 mm and a length of 2 mm, at a measurement temperature of 315° C. and a load of 98 N (10 kgf), because the moldability and workability when the resin is formed into a resin composition part will be superior. The PPS may also be substituted with an amino group, carboxyl group or the like, or may be copolymerized with trichlorobenzene or the like during polymerization.

Also, the PPX may have a linear or branched structure and heat treatment may be performed for it in an inert gas. This PPS may be subjected, before or after heating and solidification, to a deionization treatment (such as acid washing or hot water washing) or to washing with an organic solvent such as acetone to reduce the content of impurities such as ions or oligomers. Further, solidification may be accelerated by performing a heat treatment in an oxidizing gas upon completion of the polymerization reaction.

Ethylene resins, propylene resins and the like that are commonly known as polyolefin resins may be used as the polyolefin resin or a commercially available product may be used. Of these, a maleic anhydride-modified ethylene copolymer, a glycidyl methacrylate-modified ethylene copolymer, a glycidyl ether-modified ethylene copolymer, an ethylene alkyl acrylate copolymer or the like is preferable because a composite with particularly good adhesiveness can be obtained.

Examples of maleic anhydride-modified ethylene copolymers include maleic anhydride-grafted ethylene copolymers, maleic anhydride-ethylene copolymers, and ethylene-acrylic ester-maleic anhydride ternary copolymers, of which an ethylene-acrylic ester-maleic anhydride ternary copolymer is preferable because it yields a particularly good composite. A specific example of an ethylene-acrylic ester-maleic anhydride ternary copolymer is "Bondine (made by Arkema: France)".

Examples of glycidyl methacrylate-modified ethylene copolymers include glycidyl methacrylate-grafted ethylene copolymers and glycidyl methacrylate-ethylene copolymers. Of these, a glycidyl methacrylate-ethylene copolymer is preferable because it yields a particularly good composite. A specific example of a glycidyl methacrylate-ethylene copolymer is "Bondfast (made by Sumitomo Chemical: Tokyo, Japan)". Examples of glycidyl ether-modified ethylene copolymers include glycidyl ether-grafted ethylene copolymers and glycidyl ether-ethylene copolymers. A specific example of an ethylene alkyl acrylate copolymer is "Lotryl (made by Arkema: France)".

For the composite of the present invention, taking into account the fact that superior joining is obtained with a magnesium alloy part and a resin composition part, for example, the resin composition part to be joined with a shaped copper alloy will preferably be one in which a polyfunctional isocyanate compound (0.1 to 6 weight parts) and/or an epoxy resin (1 to 25 weight parts) has been added per 100 weight parts of the total resin component containing PPS by 70 to 97 wt % and polyolefin resin by 3 to 30 wt %. This polyfunctional isocyanate compound can be of a commercially available blocked or unblocked type.

Examples of unblocked polyfunctional isocyanate compounds include 4,4'-diphenylmethane diisocyanate, 4,4'-diphenylpropane diisocyanate, toluene diisocyanate, phenylene diisocyanate and bis(4-isocyanate phenyl)sulfone. Examples of blocked polyfunctional isocyanate compounds include those that have two or more isocyanate groups per molecule, whose isocyanate groups react with volatile active hydrogen compounds, and which are inert at normal temperature, while there are no particular restrictions on the type of blocked polyfunctional isocyanate compound, thus it will generally have a structure in which the isocyanate groups are masked by a blocking agent such as an alcohol, a phenol, an epsilon-caprolactam, an oxime, an active methylene compound or the like.

An example of a blocked polyfunctional isocyanate compound is "Takenate (made by Mitsui Takeda Chemical: Tokyo, Japan)". The epoxy resin here can be any epoxy resin commonly known as a bisphenol A type, a cresol novolac type or the like. An example of a bisphenol A type of epoxy resin is "Epicote (made by Japan Epoxy Resin: Tokyo, Japan)" and an example of a cresol novolac type of epoxy resin is "Epiclone (made by Dainippon Ink & Chemical, Japan)".

[Resin Composition/PBT]

The PBT resin composition will now be discussed. It is preferable rather than just the above-mentioned filler that the resin composition will also contain PET and/or polyolefin resin by 3 to 30% and PBT by 70 to 97%. The injection joining strength will be excellent with a PBT resin composition in which PBT is the main component and PET and/or a polyolefin resin is contained as an auxiliary component. The "polyolefin resin" here referred to is the same as that discussed in the section for PPS. If the PET and/or polyolefin resin component accounts for 5 to 20%, joining strength will be highest, while it will not be so bad if the amount is 3 to 5% or 20 to 30%. However, if the amount is over 30%, the effect on joining strength will be lower and if the PET component accounts for more than 25%, an ester exchange reaction in the PBT will be more likely to occur under the high temperature within the injection molding apparatus, so there is the risk of decreased strength in the resin itself. Also, if the polyolefin resin component accounts for more than 30%, there will be more gas generated and moldability will tend to be lowered.

[Manufacture of Composite/Injection Joining]

The method for manufacturing a composite of the present invention is injection molding in which a metal part is inserted and the method is carried out as follows. A metallic mold for injection molding is made ready, the mold is opened, a shaped copper or copper alloy obtained by the above treatment is inserted into one side of the mold, the mold is closed and a PBT or PSS thermoplastic resin composition is injected and solidified, after which the mold is opened and the composite is taken out.

The injection conditions will now be described. The temperature of the metallic mold has little particular effect on resin strength after solidification and so at least 100° C. is preferable and at least 120° C. is even better for a PBT or PPS resin, because the composite productivity is superior. The injection temperature, injection pressure and injection speed are not much different from those of ordinary injection molding, while if forced to say, the injection rate and injection pressure are better on the high side.

As discussed in detail above, the composite of the present invention and the method for manufacturing it allow a resin composition part and a copper metal part to be integrated so that they may not readily come apart. A composite can be manufactured in which either a thermoplastic resin composition containing PBT by 70 to 97 wt % and PET and/or a polyolefin resin by 3 to 30 wt % or a thermoplastic resin composition containing PPS by 70 to 97 wt % and a polyolefin resin by 3 to 30 wt % is strongly joined by injection joining to a shaped copper product that has undergone surface treatment according to the present invention.

BEST MODE FOR CARRYING OUT THE INVENTION

Embodiments of the present invention will now be described through working examples.

Figure 2:
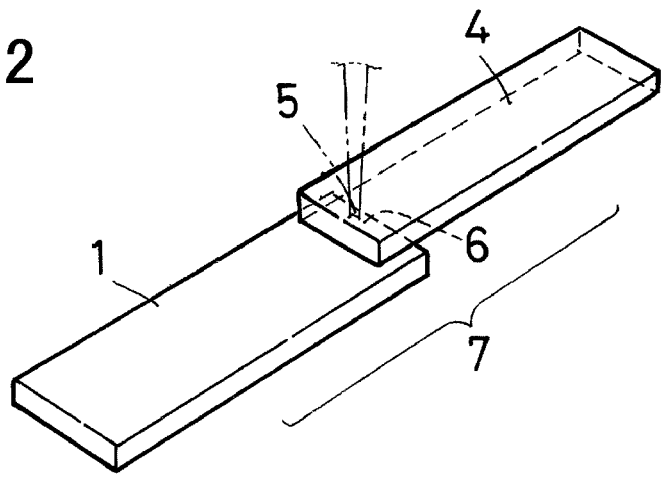
FIG. 2 is a view schematically illustrating a composite of a metal and a resin (a copper piece and a resin composition).

FIGS. 1 and 2 are used in common for all of the working examples. FIG. 1 is a cross sectional view schematically illustrating a cross section of a metallic mold for injection molding 10 used in the actual examples and shows a state in which the mold is closed and injection molding is taking place. FIG. 2 is a view of the exterior of a composite 7 of resin and metal formed in the metallic mold for injection molding 10. This metallic mold for injection molding 10 is made up of a movable mold plate 2 and a stationary mold plate 3, where a resin injector comprising a pinpoint gate 5, a runner and so forth is constituted on the stationary mold plate 3 side.

The formation of the composite 7 is carried out as follows. First, the movable mold plate 2 is opened, and a copper alloy piece 1 is inserted in the cavity formed between the movable mold plate 2 and the stationary mold plate 3. After this insertion, the movable mold plate 2 is closed, resulting in the state before injection shown in FIG. 1. A molten resin composition is then injected through the pinpoint gate 5 into the cavity in which the copper alloy was inserted.

Upon being injected, the resin composition 4 is joined with the copper alloy and fills in the cavity around the copper alloy, which gives the composite 7 in which the metal and resin are integrated. The composite 7 has a joining face 6 between the copper alloy piece 1 and the resin composition 4, thus the surface area of this joining face 6 is 5 mm×10 mm. Specifically, the surface area of the joining face 6 is 0.5 cm². In the following working examples, strength is obtained using the same basis for the surface area of the joining face. Strength is obtained under the same conditions in the comparative examples given below, as well.

WORKING EXAMPLES

Working examples of the present invention will now be described in detail through specific preparation examples (examples of makeup and polymerization of the composition) and experiment examples. The methods and apparatus used for evaluating and measuring the composite obtained through working examples will also be explained.

[Measurement of PPS Melt Viscosity]

The melt viscosity was measured with a Koka-type flow tester (made by Shimadzu: Kyoto, Japan) equipped with die having a diameter of 1 mm and a length of 2 mm, at a measurement temperature of 315° C. and under a load of 98 N (10 kgf).

(a) X-Ray Photoelectron Analyzer (XPS Observation)

One surface observation method involved use of photoelectron analyzer (XPS observation) that analyzes the energy of photoelectrons emitted from the sample upon irradiation of the same with X-rays and performs qualitative analysis of elements. This photoelectron analyzer was "Axis-Nova (product name)" (made by Kratos: England and Analytical and available from Shimadzu: Kyoto, Japan), which is a model that allows surface only a few microns in diameter to be observed to a depth of a few nanometers.

(b) Electron Microscopy

Electron microscopes were mainly used to observe the substrate surface. These electron microscopes were "S-4800 (product name)" scanning electron microscope (SEM; made by Hitachi, Tokyo, Japan) and "JSM-6700F (product name)" (made by JEOL: Tokyo, Japan), with observations made at 1 to 2 kV.

(c) Scanning Probe Microscopy

The above-mentioned microscope was further used, mainly to observe the substrate surface. This microscope is a scanning probe microscope by which the surface situation is observed with magnification using a probe that is pointed at the tip so as to move over the surface of the substance. The scanning probe microscope used was "SPM-9600 (product name, made by Shimadzu: Japsn)."

[Measurement of Composite Joining Strength]

Tensile stress was measured by pulling the composite 7 in a tensile tester to impart shearing force and the breaking force at break was termed the shearing stress. This tensile tester was "Model 1323 (product name, made by Aikho Engineering: Tokyo, Japan)" and the shearing force was measured at a pulling rate of 10 mm/minute.

Preparation Example 1

PPS Composition Preparation Example 60.9 N (6214 kgf) of $Na_2S.2.9H_2O$ and 166.6 N (17,000 gf) of N-methyl-2-pyrrolidone were supplied to a 50 liter autoclave equipped with a stirrer. The temperature was gradually raised to 205° C., while stirring the system under a nitrogen gas flow and 13.28 N (1355 gf) of water was distilled off. This system was cooled to 140° C., after which 70.17 N (7160 kgf) of p-dichlorobenzene and 49 N (5000 gf) of N-methyl-2-pyrrolidone were added and the system was sealed under a nitrogen gas flow. After the temperature of the system was raised to 225° C. over 2 hours and polymerization was conducted on the system for 2 hours at 225° C., the temperature of the system was raised to 250° C. over 30 minutes and polymerization was conducted for another 3 hours at 250° C.

Upon completion of the polymerization, the system was cooled to room temperature and the polymer was separated in a centrifugal separator. The solids of the polymer were repeatedly washed with warm water and dried over night at 100° C., which gave PPS with a melt viscosity of 280 poise (hereinafter referred to as PPS (1)). This PPS (1) was cured for 3 hours at 250° C. under a nitrogen atmosphere to obtain PPS (hereinafter referred to as PPS (2)). The melt viscosity of the resulting PPS (2) was 400 poise.

6.0 kg of the resulting PPS (2), 1.5 kg of ethylene-acrylic ester-maleic anhydride ternary copolymer "Bondine TX8030 (made by Arkema)" and 0.5 kg of epoxy resin "Epicote 1004 (made by Epoxy Resin: Japan)" were preliminarily mixed uniformly in a tumbler. After this, supplying glass fiber with an average fiber diameter of 9 μm and a fiber length of 3 mm "RES03-TP91 (made by Nippon Sheet Glass: Tokyo, Japan))" with a side feeder in an amount of 20 wt %, melt kneading was performed in a biaxial extruder "TEM-35B (made by Toshiba Machine: Shizuoka, Japan))" at a cylinder temperature of 300° C., thus giving pelletized PPS composition (1). The resulting PPS composition (1) was dried for 5 hours at 175° C.

Preparation Example 2

Preparation of PPS Composition

The PPS (1) obtained in Preparation Example 1 was cured for 3 hours at 250° C. under an oxygen atmosphere, which gave PPS (hereinafter referred to as PPS (3)). The resulting PPS (3) had a melt viscosity of 1800 poise.

5.98 kg of the resulting PPS (3) and 0.02 kg of polyethylene "Nipolon Hard 8300A (made by Tosoh: Tokyo, Japan))" were preliminarily mixed uniformly in a tumbler. After this, supplying glass fiber with an average fiber diameter of 9 μm and a fiber length of 3 mm "RES03-TP91" with a side feeder in an amount of 40 wt %, melt kneading was performed in a biaxial extruder "TEM-35B" at a cylinder temperature of 300° C., thus giving pelletized PPS composition (2). The resulting PPS composition (2) was dried for 5 hours at 175° C.

Preparation Example 3

Preparation of PPS Composition 7.2 kg of the PPS (2) obtained in Preparation Example 1 and 0.8 kg of glycidyl methacrylate-ethylene copolymer "Bondfast E (made by Sumitomo Chemical: Japan)" were preliminarily mixed uniformly in a tumbler. After this, supplying glass fiber with an average fiber diameter of 9 μm and a fiber length of 3 mm "RES03-TP91" with a side feeder in an amount of 20 wt %, melt kneading was performed in a biaxial extruder "TEM-35B" at a cylinder temperature of 300° C., thus giving pelletized PPS composition (3). The resulting PPS composition (3) was dried for 5 hours at 175° C.

Preparation Example 4

Preparation of PPS Composition 4.0 kg of the PPS (2) obtained in Preparation Example 1 and 4.0 kg of ethylene-acrylic ester-maleic anhydride ternary copolymer "Bondine TX8030 (made by Arkema: France)" were preliminarily mixed uniformly in a tumbler. After this, supplying glass fiber with an average fiber diameter of 9 μm and a fiber length of 3 mm "RES03-TP91" with a side feeder in an amount of 20 wt %, melt kneading was performed in a biaxial extruder "TEM-35B" at a cylinder temperature of 300° C., thus giving pelletized PPS composition (4). The resulting PPS composition (4) was dried for 5 hours at 175° C.

Preparation Example 5

Preparation of PBT Composition 4.5 kg of PBT resin "Toraycon 1100S (made by Toray: Japan)" and 0.5 kg of PET resin "TR-4550BH (made by Teijin Kasei)" were preliminarily mixed uniformly in a tumbler. After this, supplying glass fiber with an average fiber diameter of 9 μm and a fiber length of 3 mm "RES03-TP91" with a side feeder in an amount of 30 wt %, melt kneading was performed in a biaxial extruder "TEM-35B" at a cylinder temperature of 270° C., thus giving pelletized PBT resin composition. This was dried for 3 hours at 140° C. to obtain a PBT composition (1).

Preparation Example 6

Preparation of PBT Composition 6.0 kg of PBT resin "Toraycon 1401X31 (made by Toray: Japan)", 0.7 kg of ethylene-acrylic ester-maleic anhydride ternary copolymer "Bondine TX8030 (made by Arkema: France)" and 0.15 kg of epoxy resin "Epicote 1004 (made by Japan Epoxy Resin: Japan)" were preliminarily mixed uniformly in a tumbler. After this, supplying glass fiber with an average fiber diameter of 9 μm and a fiber length of 3 mm "RES03-TP91 (made by Nippon Sheet Glass: Japan)" with a side feeder in an amount of 30 wt %, melt kneading was performed in a biaxial extruder "TEM-35B (made by Toshiba Machine: Japan)" at a cylinder temperature of 270° C., thus giving pelletized PBT resin composition (2). The resulting PBT resin composition (2) was dried for 5 hours at 150° C.

Preparation Example 7

Preparation of PBT Composition 6.0 kg of PBT resin "Toraycon 1401X31 (made by Toray: Japan)", 0.5 kg of PET resin "TR-4550BH (made by Teijin Kasei: Japan)", 0.5 kg of ethylene-acrylic ester-maleic anhydride ternary copolymer "Bondine TX8030 (made by Arkema: France)" and 0.1 kg of epoxy resin "Epicote 1004 (made by Japan Epoxy Resin: Japan)" were preliminarily mixed uniformly in a tumbler. After this, supplying glass fiber with an average fiber diameter of 9 and a fiber length of 3 mm "RES03-TP91 (made by Nippon Sheet Glass: Japan)" with a side feeder in an amount of 30 wt %, melt kneading was performed in a biaxial extruder "TEM-35B (made by Toshiba Machine)" at a cylinder temperature of 270° C., thus giving a pelletized PBT resin composition (3). The resulting PBT resin composition (3) was dried for 5 hours at 150° C.

Experiment Example 1

Commercially available tough pitch copper (C1100) plate with a thickness of 1.5 mm was purchased and cut into numerous rectangular pieces measuring 18 mm×45 mm to obtain copper pieces which were metal plates 1. Holes were formed to pass through the ends of the metal pieces, copper wire coated with polyvinyl chloride was passed through the holes of a dozen or so pieces together, where the copper wire was bent so that the copper pieces may not overlap each other, thus allowing all the pieces to be hung up at the same time. 2 liters of an aqueous solution containing polyoxyethylene lauryl ether "Emulgen 108 by (made by Kao: Tokyo, Japan)" by 3%, sulfuric acid by 5% and hydrogen peroxide by 3% was made ready in a tank with the temperature adjusted to 30° C., 50 g of copper pieces with a thickness of 1 mm were put in and 15 minutes later the copper pieces were lifted out. The liquid had turned a pale green color and this aqueous solution was made ready as a degreasing aqueous solution. A mixed aqueous solution containing a commercially available copper etching auxiliary "CB-5002 (made by MEC: Hyogo, Japan)" by 20 wt %, a 35%-aqueous solution of hydrogen peroxide by 17.5 wt % and deionized water by 62.5 wt % was prepared in another tank with the temperature adjusted to 40° C. 50 g of copper pieces with a thickness of 1 mm were put into the mixed aqueous solution and left for 15 minutes to create an etching-use aqueous solution. This liquid was basically a mixed aqueous solution containing sulfuric acid, hydrogen peroxide and a small quantity of copper ions.

The initial copper pieces were immersed for 1 minute in the degreasing aqueous solution, rinsed with tap water (Ota City, Gunma, Japan), then immersed for 4 minutes in an etching aqueous solution and rinsed thoroughly in deionized water. Next, an aqueous solution containing caustic soda by 10% and sodium chlorite by 5% and adjusted to 70° C. was prepared in another tank. The above-mentioned metal pieces were immersed for 1 minute in this, and rinsed thoroughly in deionized water. They were then dried for 15 minutes in a warm air dryer set at 90° C. The surface had turned to an olive drab color with a reddish tint. The metal pieces were placed on clean aluminium foil with copper wire detached from, wrapped up together, then put in a plastic bag, sealed and stored. In this work, no fingers touched the surfaces to be joined (at the ends on the opposite side from where the holes were formed).

Two days later, one of the pieces was observed with an electron microscope and a scanning probe microscope. The results of observation with the electron microscope are shown in FIGS. 4a and 4b. What was seen was a rough surface shape covered by concave parts with a depth of 1 to 3 μm and a period of 10 to 100 μm and with countless fine openings with a diameter of 15 to 150 nm. Large amounts of oxygen and copper were found by ESCA, as well as a small amount of carbon. The surface layer was concluded to be copper oxide whose main component was cupric oxide, and this was corroborated by the olive drab to blackish-brown color over the reddish copper color.

One day later the remaining copper pieces were taken out, the part with the hole was grasped with a glove so that oil or the like may not adhere to and was inserted into a metallic mold for injection molding. The mold was closed and the PPS composition (1) obtained in Preparation Example 1 was injected at an injection temperature of 310° C. The mold temperature was 140° C. and 20 of the integrated composites as shown in FIG. 2 were obtained. The size of the resin part was 10 mm×45 mm×5 mm and the joining face 6 measured 10 mm×5 mm (0.5 cm$^2$). These products were placed for 1 hour in a 170° C. hot air dryer on the day of molding to anneal them and then one day later they were subjected to a tensile test, which revealed the average shear breaking strength to be 23 MPa.

Experiment Example 2

Comparative Example

Other than using the PPS composition (2) obtained in Preparation Example 2 instead of the PPS composition (1) obtained in Preparation Example 1, copper pieces were produced, injection molding was performed and composites were obtained with exactly the same method as in Experiment Example 1. The composites thus obtained were annealed for 1 hour at 170° C. That is, in this experiment, a PPS resin composition containing only PPS and a filler with a tiny amount of polyolefin polymer was used. After one day elapsed, ten of these were subjected to a tensile test, which revealed the average shear breaking strength to be 13 MPa. This was far lower compared with Experiment Example 1 and the difference of the resin material used was reflected in the result.

Experiment Example 3

Other than using the PPS composition (3) obtained in Preparation Example 3 instead of the PPS composition (1) obtained in Preparation Example 1, composites were obtained by exactly the same method as in Experiment Example 1. The composites were annealed for 1 hour at 170° C. on the day of molding and two days later these composites were measured for shear breaking strength with a tensile tester, the average of which was 19 MPa.

Experiment Example 4

Comparative Example

Other than using the PPS composition (4) obtained in Preparation Example 4 instead of the PPS composition (1) obtained in Preparation Example 1, an attempt was made to produce a composite by the same method as in Experiment Example 1. That is, in this experiment a PPS resin composition was used that contained an extremely large amount of polyolefin polymer. However, a large quantity of gas was generated during molding, which caused molding to be stopped. In this experiment the main component of the resin composition was not PPS.

Experiment Example 5

Just as in Experiment Example 1, numerous rectangular pieces measuring 18 mm×45 mm were obtained from a plate of commercially available oxygen-free copper (C1020) with a thickness of 1.5 mm. Holes were formed at the ends of the metal pieces, copper wire coated with polyvinyl chloride was passed through the holes of a dozen or so pieces and the copper wire was bent so that the copper pieces may not overlap each other, thus allowing all the pieces to be hung up at the same time.

An aqueous solution containing aluminum degreaser "NE-6 (made by Meltex: Tokyo, Japan)" by 7.5% was adjusted to 60° C. and made ready in a tank and the above-mentioned copper pieces were immersed for 5 minutes and thoroughly rinsed with tap water (Ota City, Gunma, Japan). A mixed aqueous solution containing a commercially available copper etching auxiliary "CB-5002 (made by MEC)" by 20 wt %, a 30%-aqueous solution of hydrogen peroxide by 20 wt % and deionized water by 60 wt % was adjusted to 25° C. and made ready as an etchant in another tank. This was basically a mixed aqueous solution of sulfuric acid and hydrogen peroxide. The above-mentioned metal pieces were immersed for 15 minutes in this and rinsed with water. Next, an aqueous solution containing sodium chlorite by 5% and caustic soda by 10% adjusted to 65° C. was made ready as a surface curing aqueous solution and the copper pieces previously produced were immersed in this for 1 minute.

After being rinsed with water, the copper pieces were again immersed for 1 minute in the previous etching solution. After being rinsed with water, the copper pieces were again immersed for 1 minute in the previous surface treatment aqueous solution and rinsed with water. Although this treatment was repetitious and rather complicated, it could reduce the large concave and convex period of greater than 10 μm to less than 10 μm. The copper pieces were dried for 15 minutes in a warm air dryer set to 90° C. The pieces were placed on clean aluminum foil with the copper wire detached from, wrapped up together, then put in a plastic bag, sealed and stored. In this work, no fingers touched the surfaces to be joined (at the ends on the opposite side from where the holes were formed). That is, in this experiment the conditions were harsher in the degreasing and etching steps and the surface curing step was omitted.

Figure 3A:
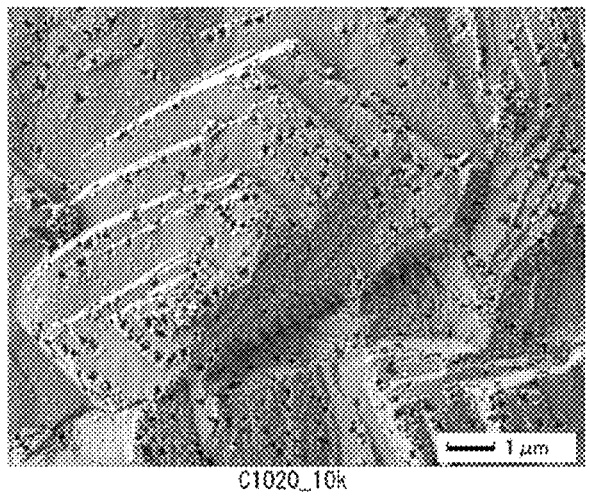
FIGS. 3(a) and (b) are micrographs of the surface of a C1020 oxygen-free copper piece obtained by oxidation treatment with sodium chlorite and using a hydrogen peroxide aqueous solution as an etchant.
Figure 3B:
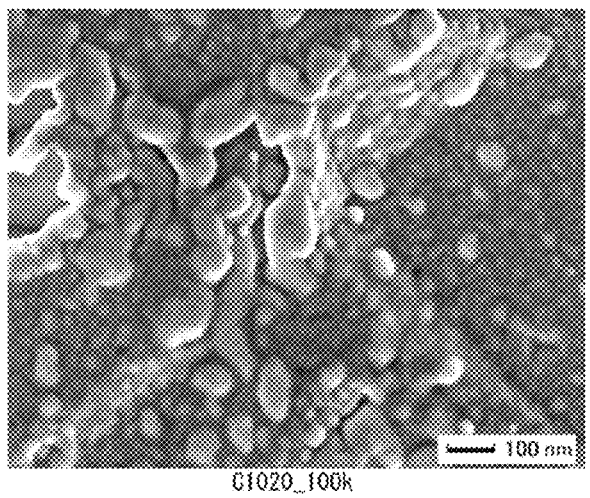

Seven days later copper pieces were taken out and observed with an electron microscope and a scanning probe microscope. The micrographs are shown in FIGS. 3a and 3b. Further two days later, a copper piece was taken out, the part with the hole was grasped with a glove so that oil or the like may not adhere to and was inserted into a metallic mold for injection molding set to 140° C. The mold was closed and the PPS composition (1) obtained in Preparation Example 1 was injected at an injection temperature of 310° C. The mold temperature was 140° C. The integrated product thus obtained was annealed for 1 hour at 170° C. and on the following day subjected to a tensile breaking test. The shear breaking strength was 21 MPa.

Experiment Example 6

Other than using the PET composition (1) obtained in Preparation Example 5 instead of the PPS composition (1) obtained in Preparation Example 1, copper pieces were produced, injection molding was performed and composites were obtained by exactly the same method as in Experiment Example 1. The injection temperature was 280° C., the mold temperature was 140° C. and the annealing conditions for the obtained composites were 1 hour at 150° C. One day later, these composites were subjected to a tensile test, which revealed the shear breaking strength to be an average of 23 MPa for 10 pieces.

Experiment Example 7

Other than using the PBT composition (1) obtained in Preparation Example 5 instead of the PPS composition (1) obtained in Preparation Example 1, copper pieces were produced, injection molding was performed and composites were obtained by exactly the same method as in Experiment Example 1. The injection temperature was 280° C., the mold temperature was 140° C. and the annealing conditions for the obtained composites were 1 hour at 150° C. One day later, these composites were subjected to a tensile test, which revealed the shear breaking strength to be an average of 23 MPa for 10 pieces.

Experiment Example 8

Other than using the PBT composition (2) obtained in Preparation Example 6 instead of the PBT composition (1) obtained in Preparation Example 5, copper pieces were produced, injection molding was performed and composites were obtained by exactly the same method as in Experiment Example 6. The annealing conditions for the obtained composites were also the same. One day later, these composites were subjected to a tensile test, which revealed the shear breaking strength to be an average of 24 MPa for 10 pieces.

Experiment Example 9

Other than using the PBT composition (3) obtained in Preparation Example 7 instead of the PBT composition (1) obtained in Preparation Example 5, copper pieces were produced, injection molding was performed and composites were obtained by exactly the same method as in Experiment Example 6. The annealing conditions for the obtained composites were also the same. One day later, these composites were subjected to a tensile test, which revealed the shear breaking strength to be an average of 23.4 MPa for 10 pieces.

Experiment Example 10

Commercially available phosphor bronze (C5191) plate with a thickness of 0.8 mm was purchased and cut into numerous rectangular pieces measuring 18 mm×45 mm to obtain copper alloy pieces which are the metal plates 1. Holes were formed at the ends of the alloy pieces, copper wire coated with polyvinyl chloride was passed through the holes of a dozen or so pieces and the copper wire was bent so that the alloy pieces may not overlap each other, thus allowing all the pieces to be hung up at the same time.

2 liters of an aqueous solution containing polyoxyethylene lauryl ether "Emulgen 108 (made by Kao: Japan)" by 3%, sulfuric acid by 5% and hydrogen peroxide by 3% was made ready in a tank, the temperature was adjusted to 40° C., about 50 g of pure copper pieces were put in and 15 minutes later the copper pieces were lifted out. The liquid had turned a pale green color and this aqueous solution was used as a degreasing aqueous solution. The above-mentioned alloy pieces were immersed for 1 minute and thoroughly rinsed with tap water (Ota City, Gunma, Japan). A mixed aqueous solution containing a commercially available copper etching auxiliary "CB-5002 (made by MEC)" by 20 wt %, a 35%-aqueous solution of hydrogen peroxide by 17.5 wt % and deionized water by 62.5 wt % was adjusted to 40° C. and made ready in another tank. This was basically a mixed aqueous solution containing sulfuric acid and hydrogen peroxide. The above-mentioned alloy pieces were immersed in this for 1 minute and thoroughly rinsed with deionized water.

Next, an aqueous solution containing sodium chlorite by 5% and caustic soda by 10% adjusted to 70° C. was made ready in another tank and the above-mentioned alloy pieces were immersed in this for 1 minute and thoroughly rinsed with deionized water. The alloy pieces were dried for 15 minutes in a warm air dryer set to 90° C. The surface had turned to an olive drab color with a reddish tint. The alloy pieces were places on clean aluminum foil with the copper wire detached from, wrapped up together, then put in a plastic bag, sealed and stored. In this work, no fingers touched the surfaces to be joined (at the ends on the opposite side from where the holes were formed).

One of the copper alloy pieces was observed with an electron microscope. The micrograph is shown in FIG. 5. One day after the treatment the alloy piece was taken out, the part with the hole was grasped with a glove so that oil or the like may not adhere to and was inserted into a metallic mold for injection molding. The mold was closed and the PPS composition (1) obtained in Preparation Example 1 was injected at an injection temperature of 310° C. The mold temperature was 140° C. and 20 of the integrated composites shown in FIG. 2 were obtained. The size of the resin part was 10 mm×45 mm×5 mm and the joining face 6 measured 10 mm×5 mm (0.5 cm$^2$). These products were placed for 1 hour in a 170° C. hot air dryer on the day of molding to anneal them and then one day later they were subjected to a tensile test, which revealed the average shear breaking strength to be 18 MPa.

Experiment Example 11

Commercially available nickel silver (C7521) plate with a thickness of 0.8 mm was purchased and cut into numerous rectangular pieces measuring 18 mm×45 mm to obtain copper alloy pieces which are the metal plates 1. Holes were formed at the ends of the alloy pieces, copper wire coated with polyvinyl chloride was passed through a dozen or so pieces and the copper wire was bent so that the alloy pieces may not overlap each other, thus allowing all the pieces to be hung up at the same time.

An aqueous solution containing polyoxyethylene lauryl ether "Emulgen 108 (made by Kao: Japan)" by 3%, sulfuric acid by 5%, hydrogen peroxide by 3% and a small quantity of copper ions, in other words the same degreaser aqueous solution as that used in Working Example 7, was made ready in a tank, the temperature was adjusted to 30° C. and the above-mentioned alloy pieces were immersed in this for 1 minute and thoroughly rinsed with tap water (Ota City, Gunma, Japan). An aqueous solution containing 98% sulfuric acid in an amount of 15 wt % and 35%-hydrogen peroxide in an amount of 17% was then adjusted to 40° C. and made ready in another tank. The above-mentioned alloy pieces were immersed in this for 3.5 minutes and rinsed with deionized water.

Next, an aqueous solution containing sodium chlorite by 5% and caustic soda by 10% adjusted to 70° C. was made ready in another tank and the above-mentioned alloy pieces were immersed in this for 1 minute and thoroughly rinsed with deionized water. The alloy pieces were dried for 15 minutes in a warm air dryer set to 90° C. The surface had turned milky white. The alloy pieces were placed on clean aluminum foil with the copper wire detached from, wrapped up together, then put in a plastic bag, sealed and stored. In this work, no fingers touched the surfaces to be joined (at the ends on the opposite side from where the holes were made).

Two days later, the alloy pieces were taken out, the part with the hole was grasped with a glove so that oil or the like may not adhere to and was inserted into a metallic mold for injection molding. The mold was closed and the PPS composition (1) obtained in Preparation Example 1 was injected at an injection temperature of 310° C. The mold temperature was 140° C. and 20 of the integrated composites shown in FIG. 2 were obtained. The size of the resin part was 10 mm×45 mm×5 mm and the joining face 6 measured 10 mm×5 mm (0.5 cm$^2$). These products were placed for 1 hour in a 170° C. hot air dryer on the day of molding to anneal them and then one day later they were subjected to a tensile test, which revealed the average shear breaking strength to be 18 MPa.

Experiment Example 12

"KFC" (an iron-containing copper alloy made by Kobe Steel: Japan) sheeting with a thickness of 0.7 mm was procured, from which numerous rectangular pieces measuring 18 mm×45 mm were obtained. Holes were formed at the ends of the metal pieces, copper wire coated with polyvinyl chloride was passed through the holes of a dozen or so pieces and the copper wire was bent so that the copper pieces may not overlap each other, thus allowing all the pieces to be hung up at the same time.

An aqueous solution containing aluminum degreaser "NE-6 (made by Meltex)" by 7.5% was adjusted to 60° C. and made ready in a tank and the above-mentioned copper pieces were immersed for 5 minutes and thoroughly rinsed with tap water (Ota City, Gunma, Japan). A mixed aqueous solution containing a commercially available copper etching auxiliary "CB-5002 (made by MEC)" by 20 wt %, a 30%-aqueous solution of hydrogen peroxide 20 wt % and deionized water by 60 wt % was adjusted to 25° C. and made ready as an etchant in another tank. The metal pieces were immersed in this for 6 minutes and rinsed with water. Next, an aqueous solution containing sodium chlorite by 5% and caustic soda by 10% adjusted to 70° C. was made ready as a surface curing aqueous solution and the copper pieces previously produced were immersed in this for 1 minute. After being rinsed with water, the copper pieces were again immersed for 1 minute in the previous etching solution. After being rinsed with water, the copper pieces were again immersed for 1 minute in the previous surface treatment aqueous solution and rinsed with water.

The copper pieces were dried for 15 minutes in a warm air dryer set to 90° C. The copper pieces were placed on clean aluminum foil with the copper wire detached from, wrapped up together, then put in a plastic bag, sealed and stored. In this work, no fingers touched the surfaces to be joined (at the ends on the opposite side from where the holes were made). Seven days later a copper piece was taken out and observed with an electron microscope and a scanning probe microscope. The electron micrographs are shown in FIG. 6. Still two days later, a copper piece was taken out, the part with the hole formed was grasped with a glove so that oil or the like may adhere to and was inserted into a metallic mold for injection molding set to 140° C. The mold was closed and the PPS composition (1) obtained in Preparation Example 1 was injected at an injection temperature of 310° C. The mold temperature was 140° C. The integrated product thus obtained was annealed for 1 hour at 170° C. and on the following day subjected to a tensile breaking test. The shear breaking strength was 23 MPa.

Experiment Example 13

"KLF5" (a copper alloy used for connector made by Kobe Steel: Japan) plate with a thickness of 0.4 mm was purchased and cut into numerous rectangular pieces measuring 18 mm×45 mm. Holes were made at the ends of the metal pieces, copper wire coated with polyvinyl chloride was passed through a dozen or so pieces and the copper wire was bent so that the copper pieces may not overlap each other, thus allowing all the pieces to be hung up at the same time.

An aqueous solution containing aluminum degreaser "NE-6 (made by Meltex)" by 7.5% was adjusted to 60° C. and made ready in a tank, then the above-mentioned copper pieces were immersed for 5 minutes and thoroughly rinsed with tap water (Ota City, Gunma, Japan). A mixed aqueous solution containing a commercially available copper etching auxiliary "CB-5002 (made by MEC)" by 20 wt %, a 30%-aqueous solution of hydrogen peroxide by 20 wt % and deionized water by 60 wt % was adjusted to 25° C. and made ready as an etchant in another tank. The above-mentioned metal pieces were immersed for 5 minutes in this and rinsed with water. Next, an aqueous solution containing sodium chlorite by 5% and caustic soda by 10% adjusted to 70° C. was made ready as a surface curing aqueous solution and the copper pieces previously produced were immersed in this for 1 minute. After being rinsed with water, the copper pieces were again immersed for 1 minute in the previous etching solution. After being rinsed with water, the copper pieces were again immersed for 1 minute in the previous surface treatment aqueous solution and rinsed with water.

The copper pieces were dried for 15 minutes in a warm air dryer set to 90° C. The copper wire was taken out of the copper pieces over clean aluminum foil, and the pieces were wrapped up together, then put in a plastic bag, sealed and stored. In this work, no fingers touched the surfaces to be joined (at the ends on the opposite side from where the holes were made).

Seven days later, copper pieces were taken out and observed with an electron microscope and a scanning probe microscope. The electron micrographs are shown in FIG. 7. Still two days later, a copper piece was taken out, the part with the hole formed was grasped with a glove so that oil or the like may not adhere to and was inserted into a metallic mold for injection molding set to 140° C. The mold was closed and the PPS composition (1) obtained in Preparation Example 1 was injected at an injection temperature of 310° C. The mold temperature was 140° C. The integrated product thus obtained was annealed for 1 hour at 170° C. and on the following day subjected to a tensile breaking test. The shear breaking strength was 23 MPa.

Appling of the present invention in various fields affords better joinability, higher efficiency, an expanded range of application and so forth and further makes possible the rationalization of manufacture and the enhancement of performance in the heat generating parts and electroconductive parts of electronic equipments and consumer electronic equipments. As a result, the present invention can contribute to better productivity and performance in parts used in mobile electronic equipments, automotive-mounted electrical and electronic equipments and in many other fields.

What is claimed is:
1. A metal and resin composite, comprising:
  a copper or copper alloy substrate which is worked into a specific shape by mechanical working and is then chemically etched to dissolve a surface thereof and of which the surface is covered with a thin layer of a copper oxide formed by an oxidant under strongly basic conditions, and a resin composition whose main component is a polyphenylene sulfide resin and which is directly joined to said surface by injection molding;

wherein a resin component of said resin composition is a resin composition in which the polyphenylene sulfide resin is a main component and a polyolefin resin is an auxiliary component;

wherein said resin composition contains the polyphenylene sulfide resin in a ratio of 70 to 97 wt % and the polyolefin resin in a ratio of 3 to 30 wt %;

wherein said surface of said copper or copper alloy substrate has one of the following configurations (a) to (d):

(a) ultrafine concave and convex faces with spacing of 10 nm to 500 nm and covered with concave or convex components having diameter of 10 to 150 nm and depth or height of 10 to 500 nm, (b) ultrafine concave and convex faces with spacing of 30 nm to 300 nm and covered with hole openings or concave components having diameter or major axis/minor axis average of 10 to 150 nm and depth or height of 10 to 500 nm, (c) ultrafine concave and convex faces with spacing of at least 10 nm, in which protrusions having diameter or major axis/minor axis average of 10 to 200 nm are mixed and present over the entire surface, and (d) a shape in which substantially the entire surface thereof is covered with ultrafine concave and convex faces having spacing of at least 10 nm and having shape in which amorphous polygons or granules with diameter of 10 to 150 nm are continuously and partially melted together and stacked over one another; and wherein said surface is also constituted by rough faces in which large concave-convex period of the concave and convex faces is 0.5 to 10 μm as peak-valley average spacing (RSm) and a concave-convex height difference of the rough faces is 0.2 to 5 μm as maximum roughness height (Rz).

2. A metal and resin composite, comprising:

a copper or copper alloy substrate which is worked into a specific shape by mechanical working and is then chemically etched to dissolve a surface thereof and of which the surface is covered with a thin layer of a copper oxide formed by an oxidant under strongly basic conditions, and a resin composition whose main component is a polybutylene terephthalate resin;

wherein a resin component of said resin composition is a resin composition in which the polybutylene terephthalate resin is a main component and a polyethylene terephthalate resin and/or polyolefin resin is an auxiliary component;

wherein said resin composition contains the polybutylene terephthalate resin in a ratio of 70 to 97 wt % and the polyethylene terephthalate resin and/or polyolefin resin in a ratio of 3 to 30 wt %;

wherein said surface of said copper or copper alloy substrate has one of the following configurations (a) to (d):

(a) ultrafine concave and convex faces with spacing of 10 nm to 500 nm and covered with concave or convex components having diameter of 10 to 150 nm and depth or height of 10 to 500 nm, (b) ultrafine concave and convex faces with spacing of 30 nm to 300 nm and covered with hole openings or concave components having diameter or major axis/minor axis average of 10 to 150 nm and depth or height of 10 to 500 nm, (c) ultrafine concave and convex faces with spacing of at least 10 nm, in which protrusions having diameter or major axis/minor axis average of 10 to 200 nm are mixed and present over the entire surface, and (d) a shape in which substantially the entire surface thereof is covered with ultrafine concave and convex faces having spacing of at least 10 nm and having shape in which amorphous polygons or granules with diameter of 10 to 150 nm are continuously and partially melted together and stacked over one another; and wherein said surface is also constituted by rough faces in which large concave-convex period of the concave and convex faces is 0.5 to 10 μm as peak-valley average spacing (RSm) and a concave-convex height difference of the rough faces is 0.2 to 5 μm as maximum roughness height (Rz).

3. The metal and resin composite according to claim 1, wherein said resin composition contains 20 to 60 wt % of at least one type of filler selected from among glass fiber, carbon fiber, aramid fiber, other reinforcing fiber, calcium carbonate, magnesium carbonate, silica, talc, clay and glass powder.

4. The metal and resin composite according to claim 2, wherein said resin composition contains 20 to 60 wt % of at least one type of filler selected from among glass fiber, carbon fiber, aramid fiber, other reinforcing fiber, calcium carbonate, magnesium carbonate, silica, talc, clay and glass powder.

* * * * *